US012599882B1

(12) United States Patent
Bollman et al.

(10) Patent No.: US 12,599,882 B1
(45) Date of Patent: Apr. 14, 2026

(54) HYBRID CALCIUM OXIDE HYDRATION AND HYDRATED LIME SLURRY PREPARATION SYSTEM

(71) Applicants:Marcus Bollman, Pittsburgh, PA (US);
Jared Bollman, Pittsburgh, PA (US);
James Godesky, Pittsburgh, PA (US)

(72) Inventors: Marcus Bollman, Pittsburgh, PA (US);
Jared Bollman, Pittsburgh, PA (US);
James Godesky, Pittsburgh, PA (US)

( * ) Notice: Subject to any disclaimer, the term of this patent is extended or adjusted under 35 U.S.C. 154(b) by 1110 days.

(21) Appl. No.: 17/589,967

(22) Filed: Feb. 1, 2022

Related U.S. Application Data

(60) Provisional application No. 63/145,160, filed on Feb. 3, 2021.

(51) Int. Cl.
| | |
|---|---|
| *C04B 2/04* | (2006.01) |
| *B01F 23/50* | (2022.01) |
| *B01F 33/80* | (2022.01) |
| *B01F 35/00* | (2022.01) |
| *B01F 35/221* | (2022.01) |
| *B01F 35/75* | (2022.01) |
| *C04B 2/02* | (2006.01) |
| *C04B 2/08* | (2006.01) |

(52) U.S. Cl.
CPC .... *B01F 35/754551* (2022.01); *B01F 23/511* (2022.01); *B01F 23/565* (2022.01); *B01F 23/59* (2022.01); *B01F 33/805* (2022.01); *B01F 35/181* (2022.01); *B01F 35/2211* (2022.01); *C04B 2/02* (2013.01)

(58) Field of Classification Search
CPC ................ C04B 2/02; C04B 2/04; C04B 2/08
See application file for complete search history.

(56) References Cited

U.S. PATENT DOCUMENTS

| | | | | |
|---|---|---|---|---|
| 2,147,191 A | * | 2/1939 | Carson ...................... | C04B 2/04 |
| | | | | 423/640 |
| 2,833,626 A | * | 5/1958 | Knibbs et al. ........... | C04B 2/04 |
| | | | | 423/640 |
| 4,401,645 A | * | 8/1983 | Gisler ..................... | B01F 33/81 |
| | | | | 423/640 |
| 4,482,528 A | * | 11/1984 | Emmett ............... | B01D 53/501 |
| | | | | 423/640 |
| 5,364,572 A | * | 11/1994 | Wu ........................ | C04B 18/021 |
| | | | | 264/117 |
| 5,458,768 A | * | 10/1995 | Andersen ................ | C01F 11/02 |
| | | | | 210/138 |
| 6,451,281 B1 | * | 9/2002 | Ebeling ................... | C02F 1/529 |
| | | | | 423/640 |

(Continued)

*Primary Examiner* — Elizabeth Insler
(74) *Attorney, Agent, or Firm* — Jones Day

(57) ABSTRACT

Systems and methods are provided for integrated system for producing hydrated lime slurry from calcium oxide using dry calcium hydroxide as an intermediary. A hydrator is configured to receive calcium oxide and to mix the received calcium oxide with water to produce dry hydrated lime. A dry hydrated lime transportation mechanism is configured to transport dry hydrated lime from the hydrator on a continuous basis over a period of time. A storage silo is configured to receive the dry hydrated lime from the transportation mechanism. A dispensing system is configured to dispense dry hydrated lime from the storage silo into a slurry tank for combining with water to generate hydrated lime slurry.

16 Claims, 9 Drawing Sheets

(56)         References Cited

U.S. PATENT DOCUMENTS

| | | | | |
|---|---|---|---|---|
| 6,568,842 B1 * | 5/2003 | Murray | ..................... | C04B 2/08 |
| | | | | 422/162 |
| 11,059,748 B2 * | 7/2021 | Wang | ..................... | B01D 53/80 |
| 2015/0203386 A1 * | 7/2015 | Christy | ..................... | C04B 2/08 |
| | | | | 423/640 |
| 2019/0264517 A1 * | 8/2019 | Chong | ................... | B01F 25/52 |

* cited by examiner

702
RECEIVE CALCIUM OXIDE

704
MIX CALCIUM OXIDE WITH WATER
TO PRODUCE DRY HYDRATED LIME

706
TRANSPORT DRY HYDRATED LIME TO
STORAGE SILO ON A CONTINUOUS BASIS

708
DISPENSE DRY HYDRATED LIME FROM
STORAGE SILO INTO A SLURRY TANK
TO GENERATE HYDRATED LIME SLURRY

HYBRID CALCIUM OXIDE HYDRATION AND HYDRATED LIME SLURRY PREPARATION SYSTEM

CROSS-REFERENCE TO RELATED APPLICATIONS

This application claims priority to U.S. Provisional Application No. 63/145,160, filed Feb. 3, 2021, entitled "Systems and Methods for CaO Slaking and Conversion," which is incorporated herein by reference in its entirety.

TECHNICAL FIELD

Certain systems and methods described herein relate generally to the production of dry Calcium Hydroxide Ca (OH), commonly referred to in the lime industry as hydrated lime, and more particularly, in embodiments, to the conversion of Calcium Oxide (CaO) to dry Calcium Hydroxide Ca (OH) and the production of hydrated lime slurry.

BACKGROUND

Dry hydrated lime (Ca (OH) 2) is commonly produced by a hydrated lime manufacturer. This hydrated lime manufacturer transports and distributes the dry hydrated lime product to their customers' facilities, where it is then mixed into hydrated lime slurry to be used in a given process.

SUMMARY

In accordance with the teachings provided herein, systems and methods are provided for an integrated system for producing hydrated lime slurry from calcium oxide using dry calcium hydroxide as an intermediary. A hydrator is configured to receive calcium oxide and to mix the received calcium oxide with water to produce dry hydrated lime. A dry hydrated lime transportation mechanism is configured to transport dry hydrated lime from the hydrator on a continuous basis over a period of time. A storage silo is configured to receive the dry hydrated lime from the transportation mechanism. A dispensing system is configured to dispense dry hydrated lime from the storage silo into a slurry tank for combining with water to generate hydrated lime slurry.

As another example, a method of producing hydrated lime slurry from calcium oxide using dry calcium hydroxide as an intermediary includes receiving calcium oxide and mixing the received calcium oxide with water to produce dry hydrated lime. The dry hydrated lime is transported to a storage silo on a continuous basis over a period of time, and dry hydrated lime is dispensed from the storage silo into a slurry tank for combining with water to generate hydrated lime slurry.

The details of one or more embodiments of the invention are set forth in the accompanying drawings and the description below. Other features, aspects, and advantages of the invention will become apparent from the description, the drawings, and the claims.

DETAILED DESCRIPTION

Figure 1A:
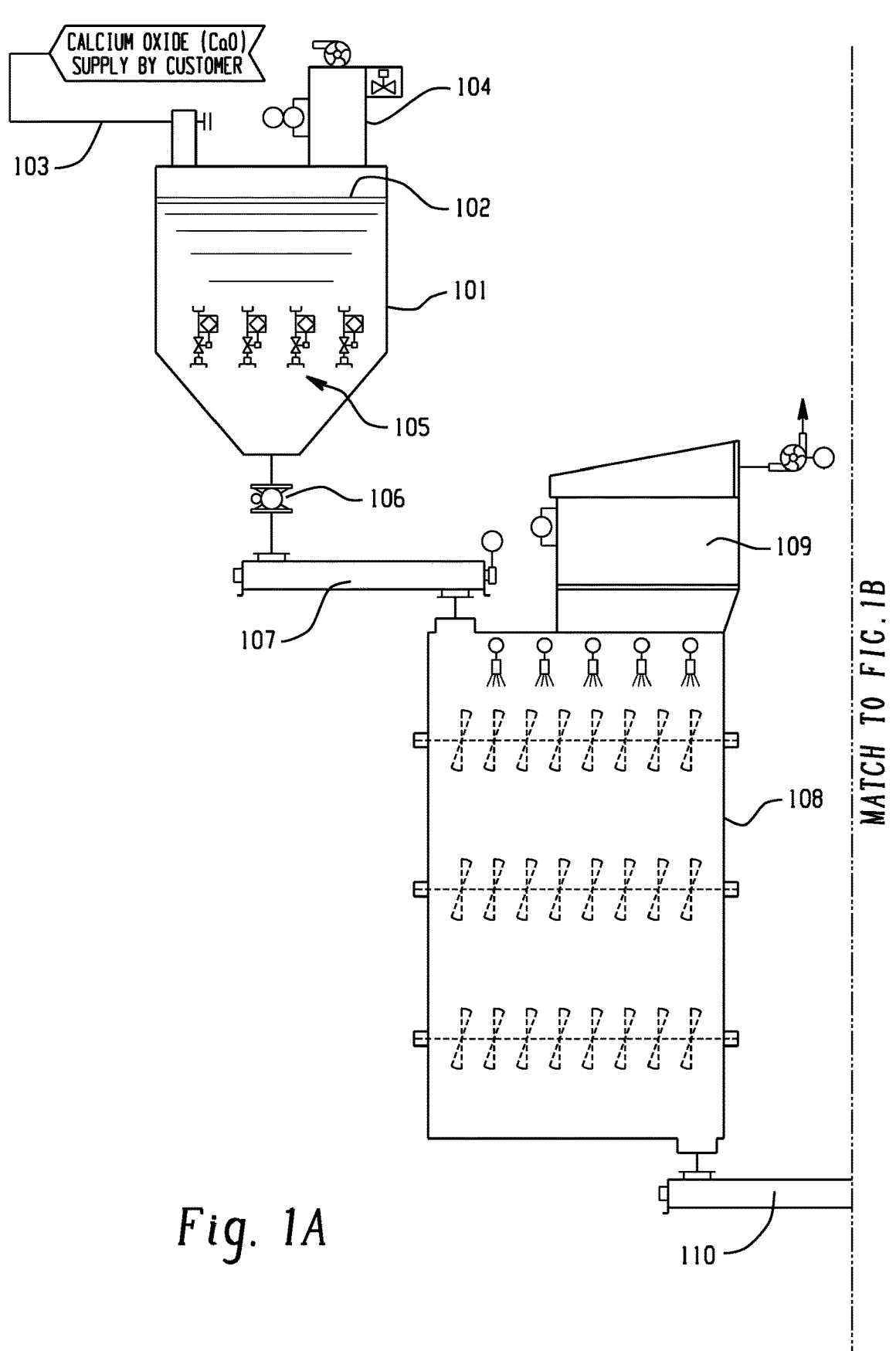
FIGS. 1A-1C is a process flow diagram depicting an example hybrid calcium oxide hydration and hydrated lime slurry preparation system.

Example systems and methods herein provide for conversion of Calcium Oxide (CaO) to dry Calcium Hydroxide (Ca (OH) 2) by means of a Calcium Oxide converter unit, i.e., a hydrator. Example processes then transfer the dry hydrated lime, either mechanically or pneumatically, to a hydrated lime slurry production system that then distributes the hydrated lime slurry to the desired process point.

Certain systems and methods herein enable a user to enjoy the benefits of utilizing hydrated lime, where hydrated lime systems often facilitate production of lime slurries having a higher lime concentration (e.g., 38% concentration versus 15-20% typically achievable using direct slaking of CaO). The use of hydrated lime may simplify the slaking process, where hydrated lime tends to not produce unwanted grit that tends to be present or form when slaking CaO. Creation of a lime slurry using hydrated lime may also be a easier chemical reaction to control, where slaking of CaO is a significantly exothermic reaction, substantially more so than creation of lime slurry from hydrated lime. Oftentimes a plant that is configured to utilize hydrated lime in creating lime slurry will simply purchase hydrated lime from a third party at a markup. In some instances, e.g., where significant amounts of lime slurry are desired to be produced on an ongoing basis, it may be worthwhile to integrate hydrated lime production with lime slurry creation into a single integrated system. Certain systems and methods herein are configured to limit water usage, such as through recycling mechanisms where steam created during the process is recaptured and reintroduced into the process at the same or differing points in the process. Certain systems and methods described herein (e.g., by producing and processing higher concentration slurries) can provide reduction in water consumption through lessened requirements for slurry deduction, reduction in scaling on equipment, reduction in tank sizes, reduction in pump velocities and system pressures, and limitation of slurry components falling out of suspension.

Systems and processes are described for a hybrid calcium oxide hydration and hydrated lime slurry preparation system that may allow for a streamlined and comprehensive process of producing hydrated lime slurry through the hydration of calcium oxide. Embodiments of systems and processes described herein may allow a single user to operate a streamlined process by which the system will hydrate the calcium oxide, classify the dry hydrated lime, and then produce hydrated lime slurry for the given process after the calcium oxide has been converted to dry calcium hydroxide (hydrated lime).

In an example, calcium oxide is delivered or transferred by mechanical or pneumatic means to a storage silo at ambient temperatures or temperatures greater than ambient. The calcium oxide storage silo is equipped with a dust collector, level monitoring devices, a pressure-vacuum relief valve, and an isolation valve on the storage silo discharge. This discharge valve is typically an isolation knife gate valve that is operated manually but can be electrically or pneumatically actuated. The calcium oxide storage silo is provided with a device that promotes material flow such as aeration sweeps, a bin activator, or by other mechanical means to ensure material flow out of the storage vessel to process is uninterrupted.

Calcium oxide may be delivered to the calcium oxide converter unit (e.g. a Hydrator) from the calcium oxide storage silo. The calcium oxide may be fed to the hydrator by means of a rotary feeder, a screw conveyor, or other types of mechanical devices. During this process, the hydrator monitors temperature and moisture content of the hydrated calcium oxide. The hydrator regulates the amount of water fed into the mixing chambers to produce dry hydrated lime product. Dust and steam are a byproduct of this process and are directed through the dust collector located on the CaO hydrator unit and the filtered air is exhausted. The steam can be recuperated or recovered as usable water during this process to be recycled into the hydration process or lime slurry production process. In such a make-up process, as described further herein, hydrated lime is mixed with water to produce a hydrated lime slurry at a desired concentration based on the quantities of hydrated lime and water that are metered into a hydrated lime slurry tank.

The efficiency of the hydration process, in an example, may be dependent on the quality and temperature of the calcium oxide and make-up water. The calcium oxide storage silo can introduce fluidized air into the silo to change the temperature of the calcium oxide to optimize the hydration process. Water heaters and chillers may be used to either heat or cool the make-up water to ideal temperatures to optimize the hydration process.

After the hydration is complete, hydrated lime may be transferred by way of a mechanical conveyor, pneumatic conveyor, or by gravity to a hydrated lime storage silo. The hydrated lime storage silo may be equipped with a dust collector, level monitoring devices, a pressure-vacuum relief valve, and an isolation knife gate valve to isolate the hydrated lime transfer line from the hydrated lime storage silo. An isolation valve is used on the storage silo discharge. This discharge valve is typically an isolation knife gate valve that is operated manually but can be electrically or pneumatically actuated. The hydrated lime storage silo is provided with a device that promotes material flow such as aeration sweeps, a bin activator, or by other mechanical means to ensure material flow out of the storage vessel to process is uninterrupted.

Hydrated lime, Ca (OH) 2, may be metered from the storage silo into a slurry mixing tank while water is proportionally added into the tank to form the desired slurry concentration by weight. All water used for the make-up process, pre-wetting, and dust suppression is monitored and controlled using a flow meter to produce an accurate slurry concentration. All water consumption is controlled and monitored via a computer processing system. No water is directed to waste.

The hydrated lime may be fed to the slurry mixing tank by means of a rotary feeder or screw conveyor. The slurry make-up system tank arrangement may use volumetric or gravimetric feed devices to achieve varying concentration accuracies, which is accomplished with load cells on the feeders and/or hydrated lime slurry tank. A pre-mix chamber or wetting box may be installed between the feeder and the hydrated lime slurry tank to suppress dust and pre-wet the dry hydrated lime. Dry hydrated lime feed rates and water flows are adjusted to optimize tank level based on the slurry consumption of the process. The dry hydrated lime and water are mixed by the hydrated lime slurry tank mixer to create a homogenous slurry with the slurry mixer agitation being sufficient to keep the hydrated lime particles in suspension. If tank level reaches a predetermined high-level, the system shuts down until a predetermined low operating level is achieved. The tank mixer remains on at all times while slurry is contained within the tank. When the slurry tank is operating, displaced air may be filtered through a dust and vapor canister that captures the hydrated lime dust and then exhausts the filtered air to the atmosphere. This process can be aided by a blower or venturi type exhaust fan.

The lime slurry can be pumped from the hydrated lime slurry tank to process or it can be transferred by gravity or other hydraulic means to a secondary feed tank. The secondary feed tank will possess level instruments or load cells to monitor the level and a tank mixer to maintain the lime slurry in suspension.

Lime slurry may be pumped from the slurry tank to the process point and unused slurry may be recirculated back to the slurry tank. An instrument that is used to measure and/or calculate slurry concentration, such as a density monitor, may be installed on the pump discharge to measure the slurry concentration. Pump speed is controlled by a variable frequency drive (VFD) and is adjusted to meet system demand as required.

Hydrated lime slurry can be dosed into the process either by variable direct injection or variable dosing off a recirculation loop with a single or multiple dosing assemblies. Direct injection involves pumping the slurry from the feed tank to the process. The dosing assemblies for a recirculation loop are configured with various valves and instruments to allow for controlled, precise dosing to the process point which is controlled by a computer processing system. There can be either a single or multiple dosing points.

In order to maintain the flows and pressure at the dosing points, the slurry line operating pressure can be manually or automatically controlled by a back-pressure valve. Manual control would consist of a local pressure gauge and a manual pinch valve that is adjusted by an operator to maintain the desired pump loop pressure. An automated control loop would include a pressure transmitter and an electric/pneumatic pinch valve that is controlled by the computer processing system that operates via a control loop to monitor the recirculation loop pressure. The automated pinch valve position is adjusted as needed to maintain the desired pump recirculation loop pressure.

An entire example system may be controlled and monitored by a computer processing system that permits operator control of the system either locally or remotely. This computer processing system may be a programmable logic controller (PLC) located within a system control panel or a plant distributed control system (DCS). The computer processing system monitors all motors, valves, instrumentation, and other components of the system and is used to control all of the electro-mechanical functions.

Figure 1B:
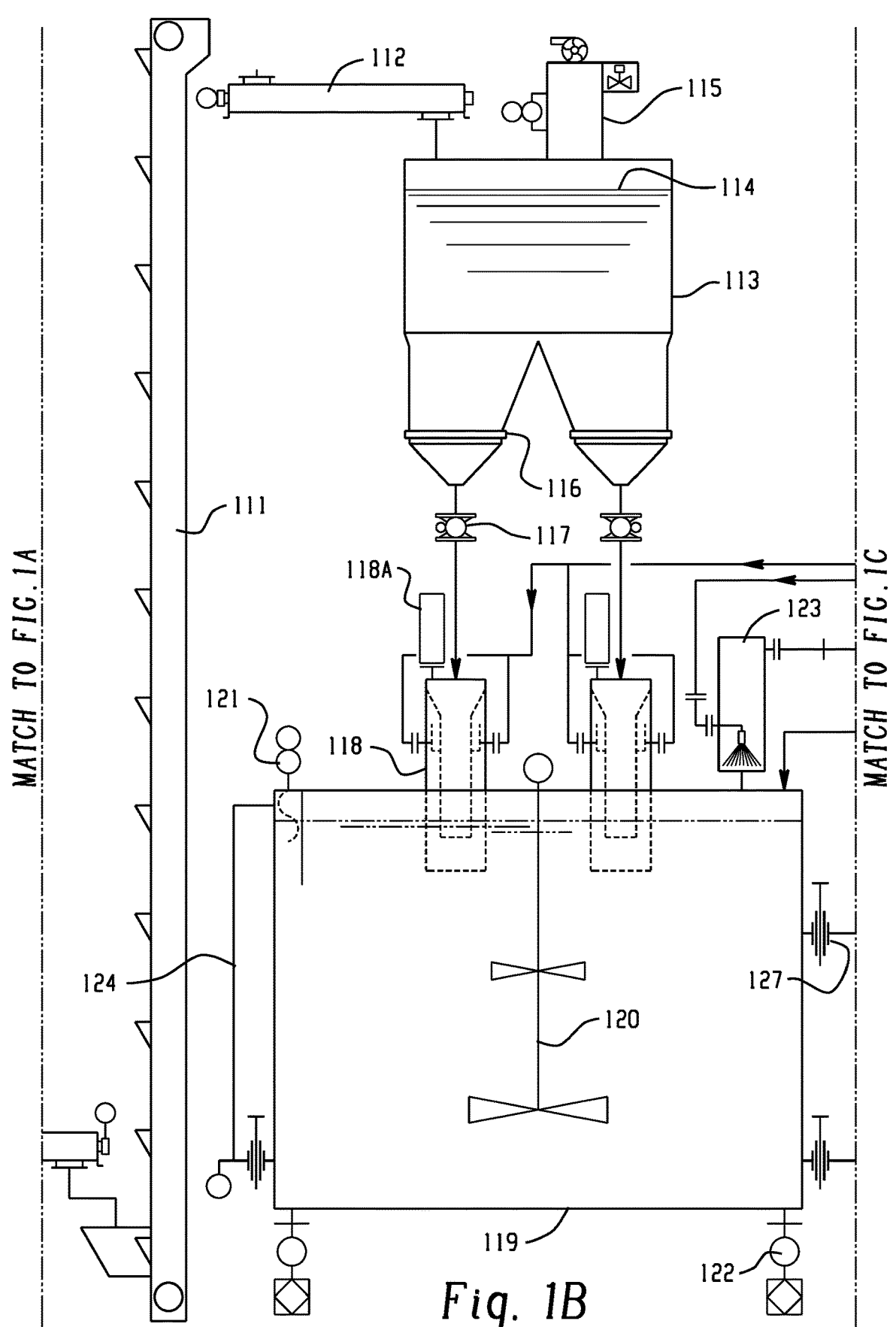
Figure 1C:
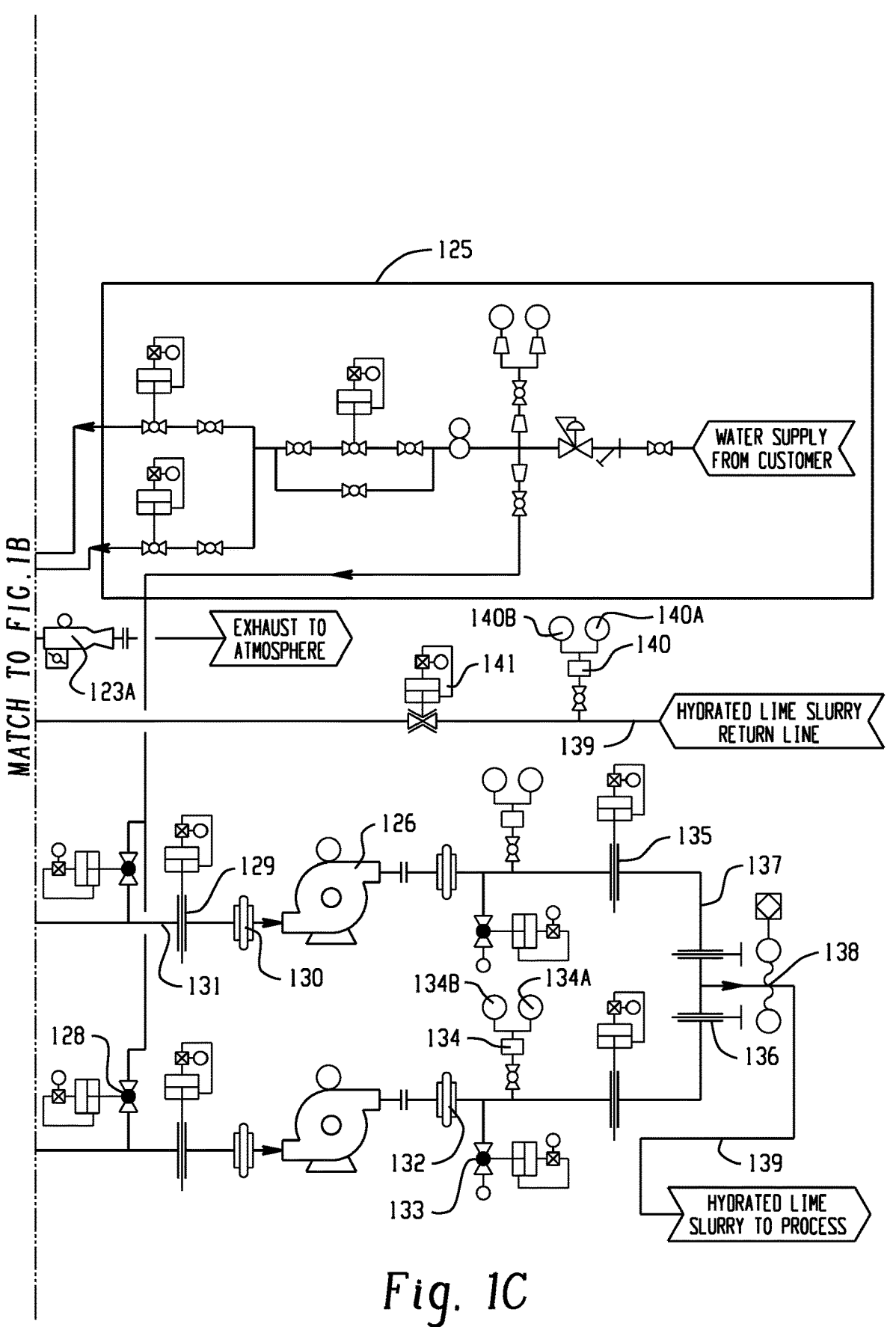

FIG. 1 is a system for a hybrid calcium oxide hydration and hydrated lime slurry preparation system that is composed of components and instrumentation to continuously produce hydrated lime slurry with no operator input or delay in providing the hydrated lime from the calcium oxide hydration system to the hydrated lime preparation system, in accordance with an embodiment.

In FIG. 1, the system is designated by the number 100. The calcium oxide storage silo 101 receives and stores calcium oxide 102, which is delivered or transferred either mechanically or pneumatically to the calcium oxide storage silo 101 by the preferred delivery method 103. Calcium oxide 102 is delivered to the calcium oxide hydrator 108 by a suitable transfer method such as a rotary feeder, screw conveyor, or other transfer method 106. This mechanical transfer method requires an appropriately sized electric motor which is automatically controlled by a programmable logic controller (PLC).

The calcium oxide storage silo 101 includes a silo dust collector 104. The silo dust collector 104 is required to maintain a suitable pressure level within the storage silo 101 while material is delivered to the silo 103. The dust collector 104 contains filter elements through which air is displaced, cleaned, and evacuated through the top of the dust collector. The calcium oxide storage silo 101 is provided with a mechanical device that promotes material flow from the silo. In FIG. 1, the system is shown with a storage silo aeration system 105. During normal automatic operation, the aeration system 105 pulses dry compressed air into the storage silo to ensure continuous material flow while the material is fed from the storage silo. The aeration sweeps 105 are mounted on the silo discharge cone. This allows the air that is discharged from the air-sweeps 105 to undercut the stored material, which fluidizes the material to promote flow out of the storage silo 101. The storage silo 101 could also be equipped with a silo bin activator in lieu of an aeration system. The bin activator promotes material flow via the counter-weight motor that creates a gyratory movement of the bin activator that dislodges stored material.

From the discharge of the storage silo 101, calcium oxide 102 is fed mechanically or by gravity into the hydrator 108. FIG. 1 shows the mechanical delivery of the calcium oxide 102 to the hydrator 108 by means of a rotary feeder 106 and screw conveyor 107. The calcium oxide 102 can also be fed by gravity through a suitably sized chute from the storage silo 101 discharge to the hydrator 108 inlet if space allows for the hydrator 108 to be positioned directly beneath the storage silo.

Figure 2:
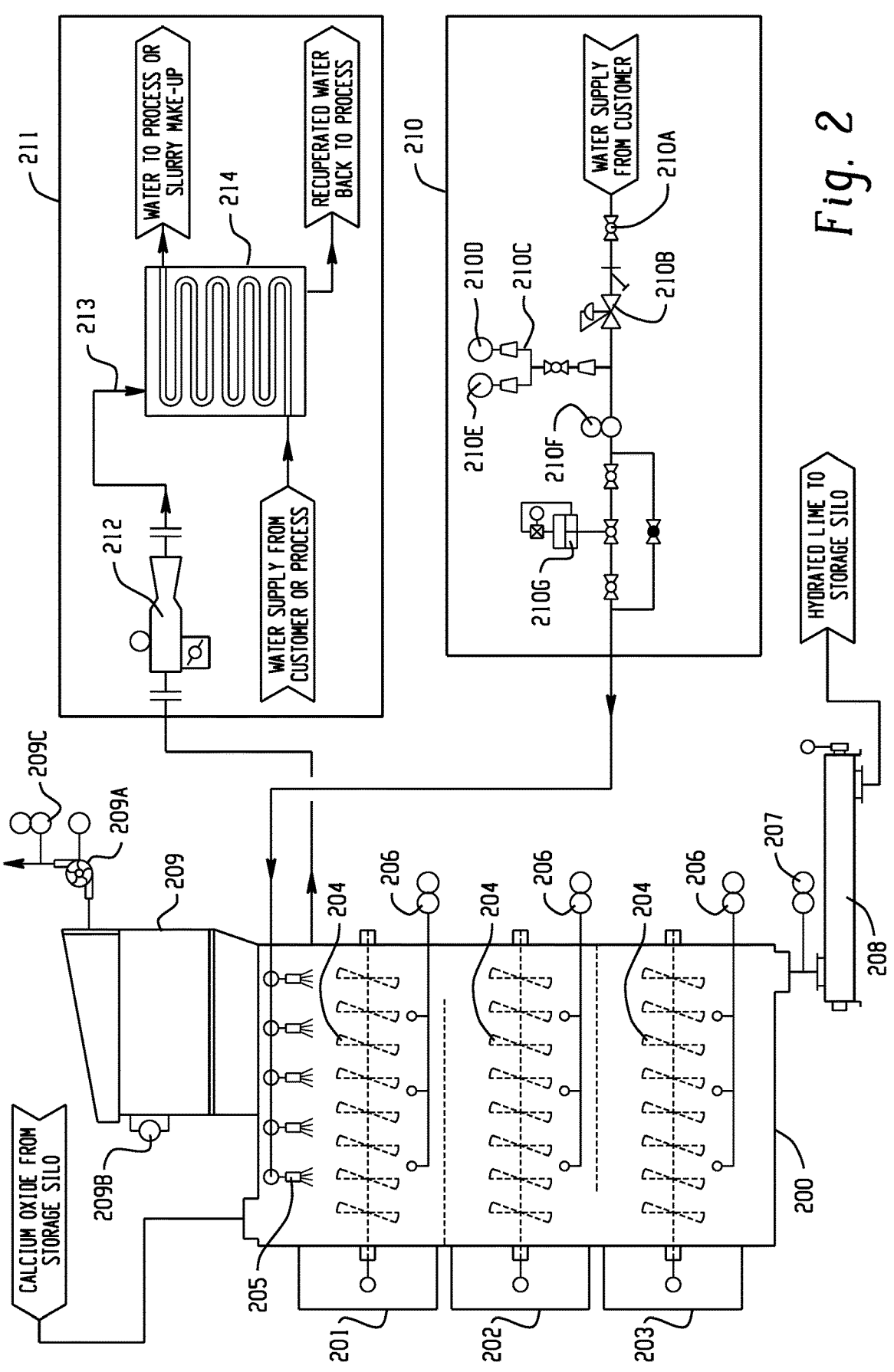
FIG. 2 is a schematic depicting an example calcium oxide hydrator with steam recuperation system.

In FIG. 1, the hydrator 108 is depicted in the total process, while FIG. 2 represents the hydrator 200 specifically. The hydrator 200 may be constructed with a single or multiple stages depending on the material output desired for the process. FIG. 2 represents a 3-stage hydrator 200, consisting of a reaction chamber 201, a mixing chamber 202, and a retention chamber 203 connected finish to start in a serpentine fashion. In examples, greater than or fewer than three chambers may be utilized. Each chamber contains horizontal rotating shafts 204 with specially designed paddles to mix continuously the reacting lime and the water. The first stage chamber 201 receives the calcium oxide and the hydration water from the water nozzles 205 located in the reaction chamber 201. The reaction chamber 201 provides a strong mixing to the calcium oxide and water to start the hydration process. The water for the water nozzles 205 is supplied from the hydrator water supply panel 210. The hydrator water supply panel 210 may be constructed with similar valves and instruments to those supplied in water supply panel 125. The inlet of the hydrator water supply panel 210 may be constructed with an isolation ball valve 210A and a water pressure reducing valve 210B. The pressure reducing valve 210B is to be set at the required operating pressure of the system in order to provide the necessary supply water to the hydrator. The pressure assembly 210C may consist of a suitably sized pressure gauge 210D and pressure switch 210E. The pressure assembly 210C may also include a pressure transmitter. The pressure assembly 210C allows for the pressure to be monitored by the control system and to set the water supply panel 210 pressure at the pressure reducing valve 210B. The flow meter 210F monitors the water supply to the hydrator 200 and transmits that information to the control system to be used to confirm the correct amount of water is being provided to the hydrator 200 for the amount of calcium oxide being supplied to the hydrator 200 represented in FIG. 2. The water supply panel 210 may include a v-port control modulating ball valve 210G that allows for precise flow control of water to the hydration process. The v-port modulating ball 210G valve may be electrically or electro-pneumatically actuated.

At the end of the reaction chamber 201, the lime drops into the second stage, the mixing chamber 202, where the material is mixed by the second agitator 204 and the hydration reaction is nearly complete. The lime then drops into the third chamber, the retention chamber 203, where the lime is again mixed to produce a uniform hydrated lime and to provide additional retention time to hydrate any slow reacting calcium oxide. Throughout each mixing chamber 201/202/203, the lime temperature is monitored by temperature transmitters 206 located at each mixing chamber, while a moisture analyzer 207 at the discharge of the hydrator monitors the moisture content of the hydrated lime. The hydrator may include a screw conveyor 208 at the hydrator discharge to transfer the hydrated lime to process.

The hydrator 200 may be equipped with a dust collector unit 209 as depicted in FIG. 2. The dust collector is an air filtering device that includes filtering elements. As material is fed into the hydrator 200, air is displaced and evacuated through the filter elements of the dust collector 209. An exhaust blower 209A may be included on the dust collector 209. The exhaust draws dust-laden air from within the hydrator 200 at nearly the same rate of air entering the hydrator 200. As the air passes through the filter cartridges, smaller particles adhere to the outer surface of the filtering media while larger particles drop into the storage cylinder. Clean, filtered air continues up the cartridge's hollow core to the clean air plenum where it is discharged through the exhaust blower. The dust collector 209 may include differential pressure gauge/transmitter 209B for measuring the differential pressure between the filtering device and atmospheric pressure. The exhaust blower 209A discharge piping may include a temperature transmitter 209C for monitoring the exhaust air temperature.

A steam recuperation system 211 may be installed on the hydrator 200 to capture and condense the steam that is produced during the dry hydration process as depicted in FIG. 2. Water from the supply panel 210 is paced into the hydrator at specific quantities to minimize moisture content, but to optimize the conversion of calcium oxide to calcium hydroxide. The dust collector 209 mounted on the hydrator 200 is designed for a humid environment and to exhaust the steam. The steam recuperation system 211 would use an induced-draft fan 212 to assist with the removal of steam from the hydrator 200. The steam may be forced through ductwork 213 and across a condenser system 214 to convert the steam into water. The water used in the condenser system 214 tubes may be used in the hydrator process to produce dry hydrated lime or it may be used in the slurry preparation process to produce hydrated lime slurry. The water recovered from the steam recuperation system 211 may be collected in a tank and may be used in the hydrator process 200 to produce dry hydrated lime or it may be used in the slurry preparation process as depicted at the lime slurry tank 119 in FIG. 1 to produce hydrated lime slurry.

FIG. 1 illustrates that the hydrated lime may be transferred from the hydrator screw conveyor 110 at its discharge end to a mechanical conveyor 111 that will transfer the hydrated lime to a hydrated lime storage silo 113. The mechanical conveyor 111 may require a screw conveyor 112 to transfer the hydrated lime 114 from the mechanical conveyor 111 to the storage silo 113 if the mechanical conveyor 111 is not able to discharge directly into the storage silo 113.

The hydrated lime storage silo 113 may be equipped with a dust collector 115A, a level monitoring device 115B, and a pressure-vacuum relief valve 115C as shown in FIG. 1. The hydrated lime storage silo 113 is shown with two discharge cones in FIG. 1, the storage silo may be provided with a single or more than two discharge cones. An isolation valve 113A may be used on the storage silo discharge. The discharge valve 113A is typically an isolation knife gate valve that is operated manually but can be electrically or pneumatically actuated. The hydrated lime storage silo 113 is provided with a device that promotes material flow such as aeration sweeps, a bin activator, or by other mechanical means to ensure material flow out of the storage vessel to process is uninterrupted. In FIG. 1, the system is shown with bin activators 116. During normal automatic operation, the bin activator 116 promotes material flow via the counterweight motor that creates a gyratory movement of the bin activator that dislodges stored material. The operation of the bin activator is controlled by the computer processing system.

Hydrated lime 114, Ca (OH) 2, may be metered from the storage silo 113 into a slurry mixing tank 119 while water is proportionally added into the slurry tank 119 to form the desired slurry concentration by weight. All water used for the make-up process, pre-wetting, and dust suppression is monitored and controlled using a flow meter to produce an accurate slurry concentration.

Figure 6:
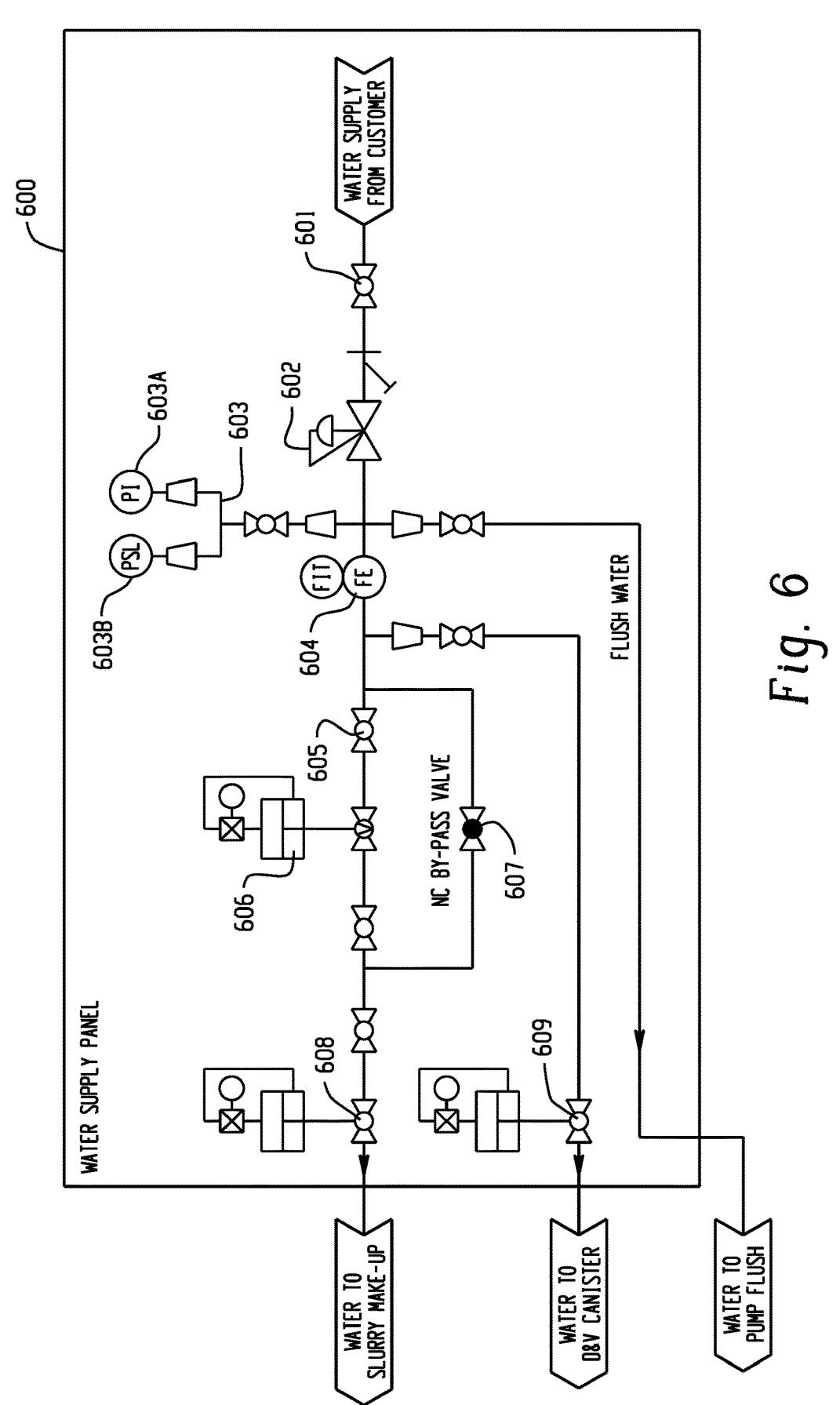
FIG. 6 is a block diagram depicting an example water supply panel.

In FIG. 1, the water supply panel 125 is depicted in the total process, while FIG. 6 represents the specific components of an example water supply panel. The inlet of the water supply panel 125 may be constructed with an isolation ball valve 601 and a water pressure reducing valve 602. The pressure reducing valve 602 is to be set at the required operating pressure of the system in order to provide the necessary supply water to the make-up process, pre-wetting, and dust suppression system. The pressure assembly 603 may consist of a suitably sized pressure gauge 603A and pressure switch 603B. The pressure assembly 603 may also include a pressure transmitter. The pressure assembly 603 allows for the pressure to be monitored by the control system and to set the water supply panel 600 pressure at the pressure reducing valve 602. The flow meter 604 monitors the water supply to process and transmits that information to the control system to be used to confirm the correct amount of water is being provided to the system for the amount of lime being supplied to the slurry tank 119 represented in FIG. 1. This allows the control system to calculate the slurry concentration and to adjust the hydrated lime or water supply to meet the desired concentration for the process. The water supply panel 600 may include a v-port control modulating ball valve 606 that allows for precise flow control of water to the make-up slurry process. The v-port modulating ball valve 606 may be electrically or electro-pneumatically actuated. The slurry make-up line may include an on/off actuated ball valve 608 after the modulating control valve 606. The on/off actuated ball valve 608 may be provided when there are multiple hydrated lime feed trains, which would allow for the water supply to go to the feed train that is in operation. The water supply panel 600 may also include an on/off actuated ball valve 609 for the dust & vapor canister 123 water supply. The control of the water supply panel may be automated by a PLC or Plant DCS through the specific operating parameters developed for the control system. The control system for the slurry make-up uses a specific formula to determine the optimal hydrated lime feed and water requirement to meet the desired hydrated lime slurry concentration for the process. FIG. 6 is an example of a water supply panel 600 with standard components within the industry that may be provided for a slurry make-up system.

In FIG. 1, the hydrated lime 114 is metered into the slurry mixing tank 119 by means of a rotary feeder 117. Between the rotary feeder 117 and the slurry tank 119, the hydrated lime 114 may be pre-wetted by a wetting box 118. The wetting box 118 is supplied with water from the water supply panel 125. The hydrated lime wetting box 118 allows for pre-wetting of the hydrated lime 114 prior to entering the hydrated lime slurry tank 119 to reduce dusting within the hydrated lime slurry tank 119. The hydrated lime wetting box 118 may contain a breather filter sock 118A to allow for displaced air within the wetting box 118 to be exhausted so that the wetting curtain does not collapse due to a pressure imbalance. The hydrated lime slurry tank 119 may not include the wetting box 118; in this case the hydrated lime 114 from the rotary feeder 117 would be directly metered into the slurry tank 119 and the water supply 125A would be directed through the slurry tank 119 roof.

The hydrated lime 114 and water enter the slurry tank 119 where the slurry tank mixer 120 provides the necessary agitator to mix the hydrated lime 114 and water into a homogenous slurry. The slurry tank agitator 120 impellers and motor are suitably sized for the process to provide the necessary agitation to create the hydrated lime slurry and to keep the hydrated lime particles in suspension. The slurry tank 119 may include a continuous level monitoring device 121, a dust & vapor canister 123, weigh load cells 122, and overflow/drain piping 124. The level monitoring device 121 provides a continuous slurry tank level to the control system, if the slurry tank level reaches a predetermined high-level, the system shuts down until a predetermined low operating level is achieved.

The slurry tank 119 may use load cells 122 for precise measurement of the weight of lime fed into the slurry tank. The load cells 122 provide the weight of the tank to the control system as hydrated lime 114 is fed into the slurry tank 119. The control system may use the hydrated lime weight from the load cells 122, the water quantity from the load cells 122, and the water quantity from the flow meter on the water supply panel 125 to calculate the slurry concentration.

When the slurry tank 119 is operating, displaced air is filtered through a dust and vapor canister 123 that captures the hydrated lime dust and then exhausts the filtered air to the atmosphere. This process may be aided by a blower or venturi type exhaust fan 123A. The dust and vapor canister 123 includes internal water sprays that capture hydrated lime dust particles. The captured hydrated lime and the spray water drain back into the hydrated lime slurry tank 119. The water going to the dust and vapor canister is provided from the water supply panel 125. This water is included in the hydrated lime slurry concentration calculation that is performed by the control system.

In the illustration of FIG. 1, the slurry tank 119 is provided with multiple pump suction connections. The pump suction lines 131 may include a manual isolation valve 127, an automated isolation valve 129, an electric or pneumatic pump flush valve 128, and an expansion joint 130. The pump discharge lines 137 may include an expansion joint 132, an electric or pneumatic pump flush/drain valve 133, a pressure monitoring assembly 134, an automated isolation valve 135, and a manual isolation valve 136. The pump discharge pressure assembly 134 may consist of a pressure gauge 134A and pressure transmitter 134B. The pressure transmitter 134B monitors the pump discharge pressure and sends this signal to the control system for the process. The control system monitors this pressure to ensure the pump 126 is operated within the design pressure of the system. The valves on the pump suction 131 or discharge lines 137 may be manual or automated. The pump discharge lines 137 may converge to a common line to pump slurry to the process loop 139. This process loop 139 may include a density meter 138 for monitoring the hydrated lime slurry concentration. The density meter 138 transmits the hydrated lime slurry concentration to the control system, which evaluates the signal against the desired slurry concentration for the system. Based on this feedback, the control system may adjust the hydrated lime feed or the water make-up supply to the slurry tank 119 to adjust the concentration to the desired set point. It will be understood that any number of pumps and associated valving, piping, and instrumentation may be included in this process.

The hydrated lime slurry pump loop 139 may return the unused hydrated lime slurry to the hydrated lime slurry tank 119 as shown in FIG. 1. This slurry return line 139 may include a pressure assembly 140 and a back pressure pinch valve 141 to control slurry pump loop 139 pressure. The back pressure pinch valve 141 may be manually or automatically controlled. The back pressure pinch valve 141 is adjusted to maintain the necessary pressure in the slurry pump loop 139 so that the hydrated lime slurry may be dosed to the process. The pressure assembly 140 may include a pressure gauge 140A and a pressure transmitter 140B. The pressure transmitter 140B monitors the slurry loop 139 pressure and provides feedback to the control system of the operating pressure of the slurry loop 139. FIG. 1 depicts an automated system by which the pressure assembly 140 provides the slurry loop 139 pressure to the control system and the control system then adjusts the back pressure pinch valve 141 as needed to meet the desired set point pressure for the slurry loop 139.

With respect to FIG. 1, there is provided a method and process by which hydrated lime slurry is produced in a hydrated lime slurry tank 119 and then pumped to process. The delivery method by which hydrated lime slurry may be delivered to process is presented in FIG. 3 and FIG. 4 with the arrangement of components for the pump suction lines and discharge lines in these depictions being similar to those components provided in FIG. 1.

Figure 3:
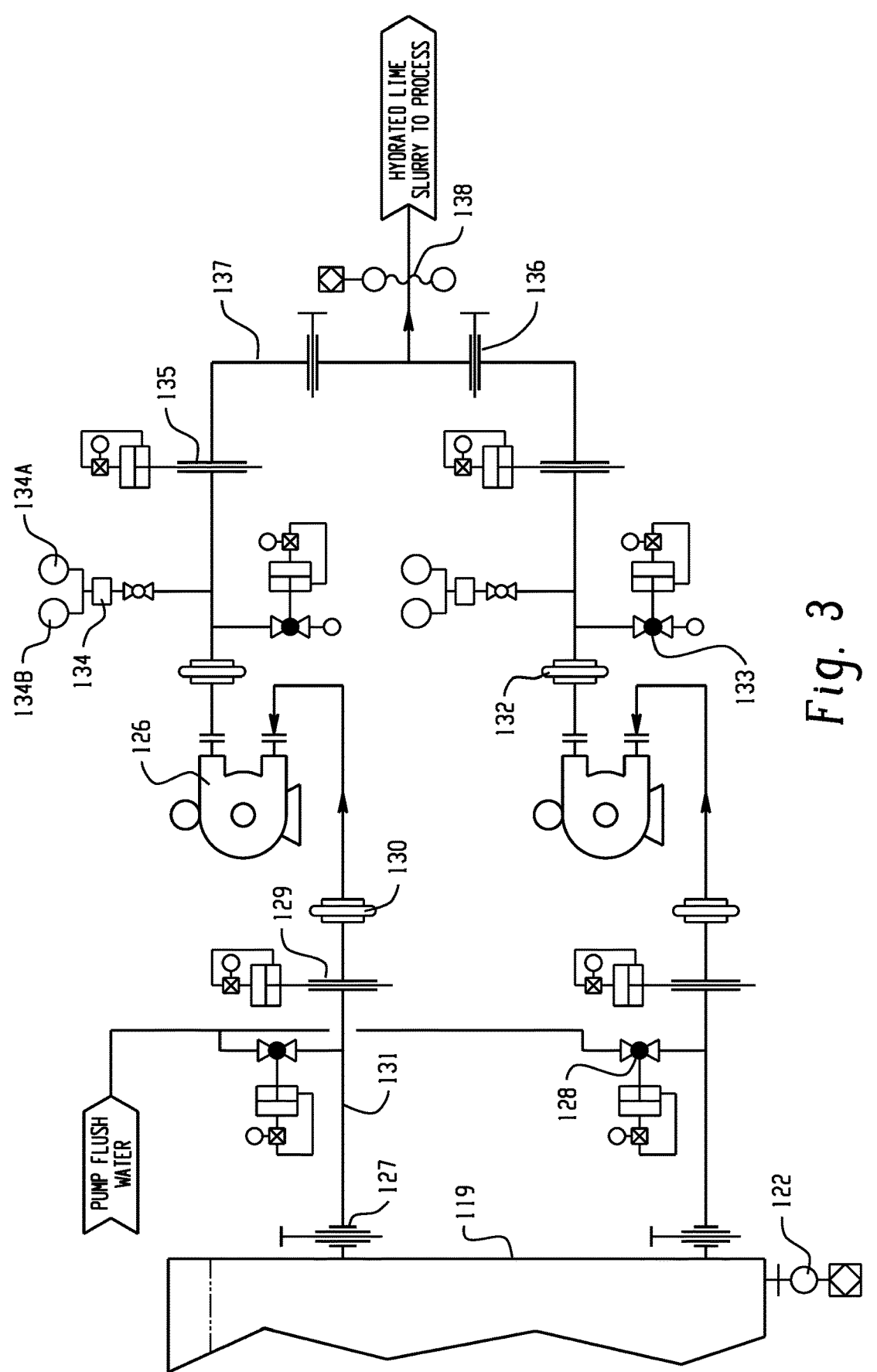
FIG. 3 is a block diagram depicting an example hydrated lime slurry pumping loop arrangement with valving, instrumentation, and dosing assemblies by which lime slurry is delivered to a single or multiple dosing locations.

FIG. 3 represents a system that directly doses hydrated lime slurry to process by a direct slurry discharge line. This configuration does not include a slurry return loop as represented in FIG. 1. The slurry for direct injection may be a delivered to process by a positive displacement pump that is designed for direct injection.

Figure 4:
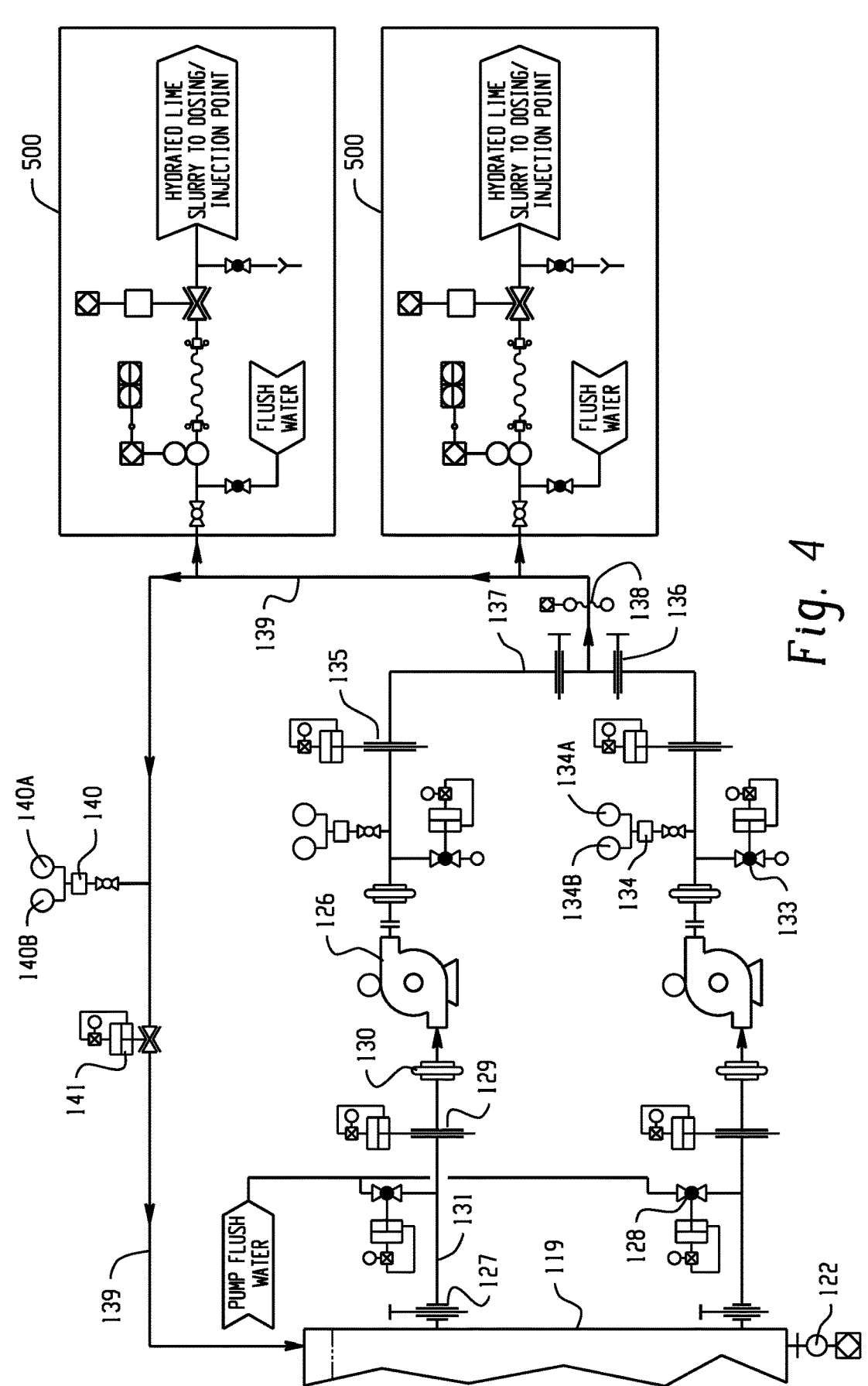
FIG. 4 is a block diagram depicting an example hydrated lime slurry pumping loop arrangement with valving, instrumentation, and dosing assemblies by which lime slurry is delivered by direct injection to process.
Figure 5:
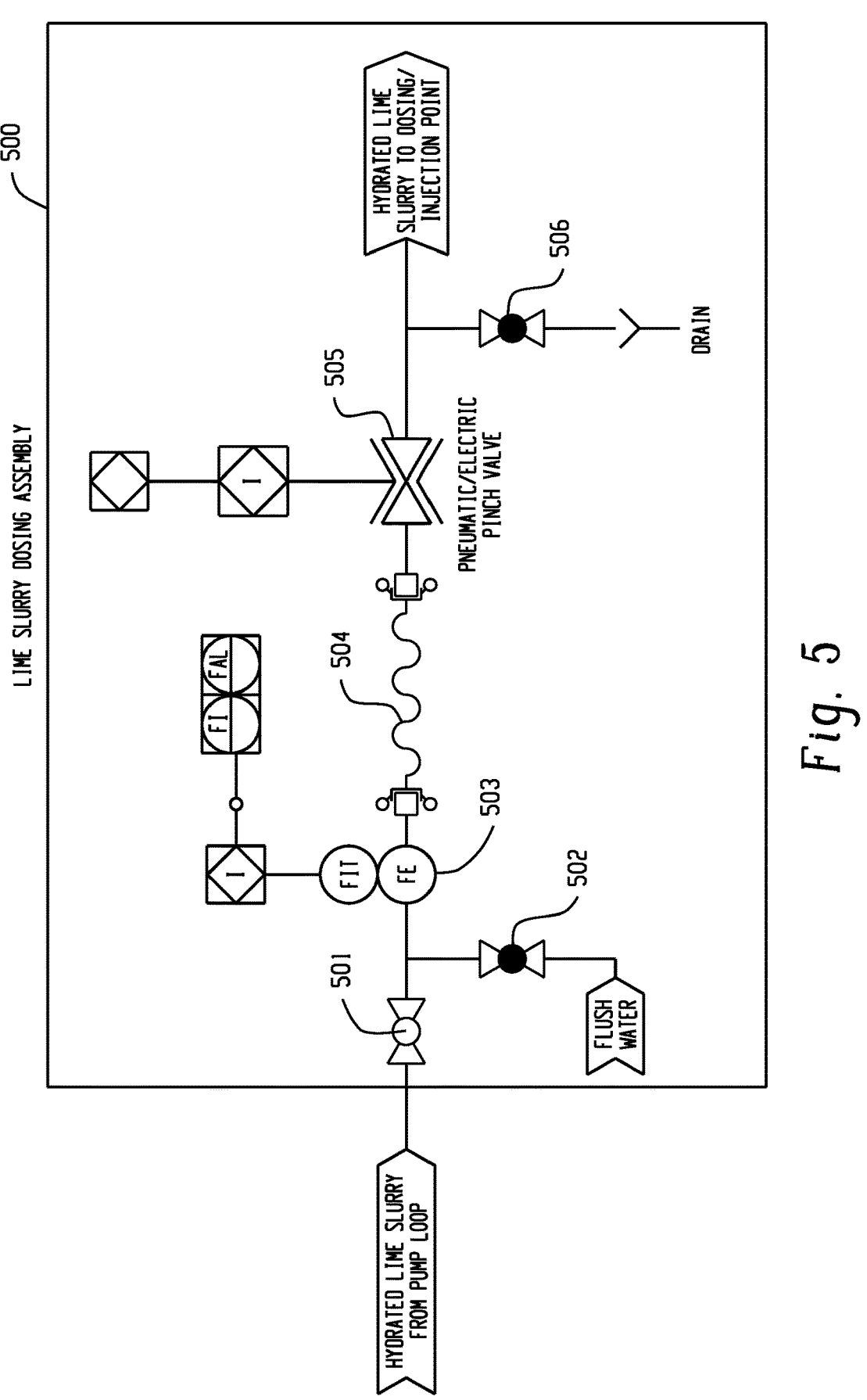
FIG. 5 is a block diagram depicting an example dosing assembly.

FIG. 4 represents a system that provides variable dosing off a slurry pump recirculation loop. The pump suction and pump discharge valving, components, and piping are similar in likeness to those represented in FIG. 1. The lime slurry recirculation 139 includes two hydrated lime slurry dosing assemblies 500. The hydrated lime dosing assembly 500 includes valves and instruments as illustrated in FIG. 5. The hydrated lime dosing assembly 500 provides a method by which hydrated lime slurry may be delivered to a process point. The process represented in FIG. 1 and FIG. 4 may include any number of dosing assemblies 500 for the process.

In FIG. 5, the hydrated lime dosing assembly is illustrated with various components. The hydrated lime dosing assembly 500 may include an isolation ball valve 501 for isolating an individual dosing assembly from the slurry process loop 139 represented in FIG. 1 and FIG. 4. The dosing assembly 500 may also include flush 502 and drain 506 valves for purging the dosing assembly of hydrated lime. The flow meter 503 monitors the hydrated lime slurry going to process through the dosing assembly 500. The flow meter 503 transmits that information to the control system to be used to confirm the correct amount of hydrated lime slurry is being provided to the dosing point. This allows the control system to modulate the position of the automated pinch valve 505 to provide precise dosing to process based on the information from the flow meter 503. The flexible hosing 504 may be provided for maintenance purposes if hydrated lime slurry plugs the dosing assembly.

Hydrated lime slurry can be dosed into the process either by variable direct injection or variable dosing off a recirculation loop with a single or multiple dosing assemblies. Direct injection involves pumping the slurry from the feed tank to the process. The dosing assemblies for a recirculation loop are configured with various valves and instruments to allow for controlled, precise dosing to the process point which is controlled by a PLC or the Plant DCS. There can be either a single or multiple dosing points.

The entire system may be controlled and monitored by a computer processing system that permits operator control of the system either locally or remotely.

Figure 7:
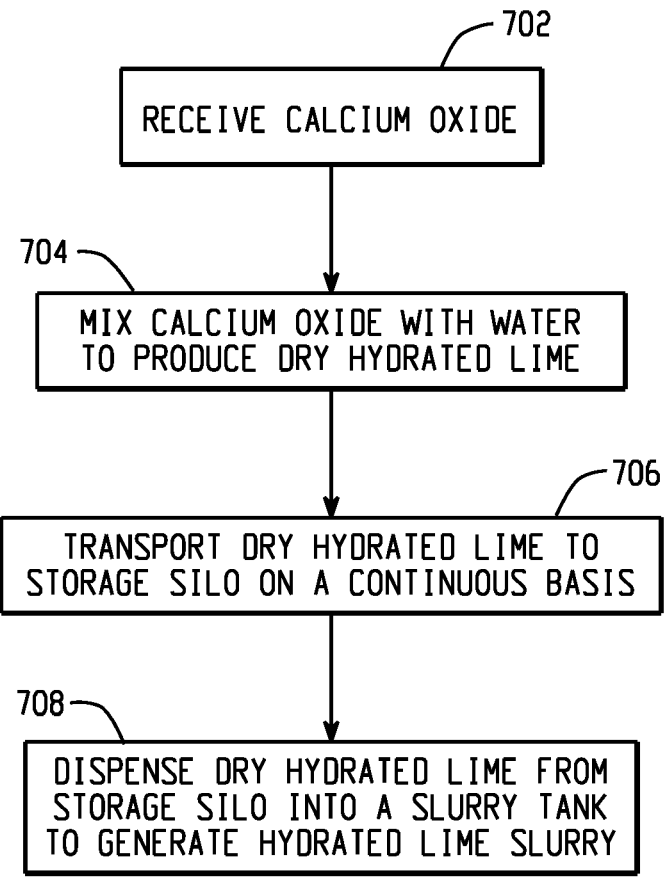
FIG. 7 is a flow diagram depicting a method of producing hydrated lime slurry from calcium oxide using dry calcium hydroxide as an intermediary.

FIG. 7 is a flow diagram depicting a method of producing hydrated lime slurry from calcium oxide using dry calcium hydroxide as an intermediary. At 702, calcium oxide is received and at 704 the received calcium oxide is mixed with water to produce dry hydrated lime. The dry hydrated lime is transported at 706 to a storage silo on a continuous basis over a period of time (e.g., 5 minutes, 10 minutes, one hour, multiple hours, days with limited or no human supervision), and at 708 dry hydrated lime is dispensed from the storage silo into a slurry tank for combining with water to generate hydrated lime slurry.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

It is claimed:

1. An integrated system for producing hydrated lime slurry from calcium oxide using dry hydrated lime as an intermediary, comprising:

a hydrator configured to receive calcium oxide and to mix the received calcium oxide with water to produce dry hydrated lime;

a dry hydrated lime transportation mechanism configured to transport the dry hydrated lime from the hydrator on a continuous basis over a period of time;

a storage silo configured to receive the dry hydrated lime from the transportation mechanism;

a dispensing system configured to dispense the dry hydrated lime from the storage silo;

a slurry tank configured to receive the dispensed dry hydrated lime and combine the dry hydrated lime with water to generate hydrated lime slurry; and a distribution system configured to transport the hydrated lime slurry from the slurry tank to a separate process that consumes hydrated lime slurry, wherein the slurry tank is configured to receive the entire output of dry hydrated lime from the storage silo via the dispensing system;

wherein the hydrator further comprises three chambers connected start to finish in a serpentine configuration, each comprising:

horizontal rotating shafts configured to continuously mix the received calcium oxide and the water to form dry hydrated lime; and temperature transmitters configured to monitor a temperature in each chamber, wherein the first chamber further comprises water spray nozzles configured to supply the water for the hydrator, wherein the third chamber further comprises a moisture analyzer configured to monitor a moisture content of the dry hydrated lime exiting the hydrator.

2. The system of claim 1, further comprising a steam recapture system and a corresponding tank, wherein the steam recapture system is configured to capture steam generated at the hydrator and to store liquid generated by condensing said steam in the corresponding tank.

3. The system of claim 2, wherein:

the hydrator is configured to receive the liquid from the corresponding tank for use in production of additional dry hydrated lime; and the slurry tank is configured to receive the liquid from the corresponding tank for generation of the hydrated lime slurry.

4. The system of claim 1, wherein the distribution system comprises a slurry loop configured to dispense a first portion of the hydrated lime slurry to the separate process and return a remaining portion of the hydrated lime slurry to the slurry tank.

5. The system of claim 1, wherein a flowmeter is configured to measure an amount of water added to the first chamber.

6. The system of claim 1, wherein the dry hydrated lime transportation mechanism comprises a screw conveyor and a mechanical conveyor configured to transport the dry hydrated lime from the hydrator to the storage silo.

7. The system of claim 1, wherein the dispensing system comprises a pre-wetting box, wherein the pre-wetting box is configured to receive the dry hydrated lime from the silo and add water to the dry hydrated lime prior to dispensing the dry hydrated lime into the slurry tank.

8. The system of claim 1, further comprising a first dust trap associated with the hydrator and a second dust trap associated with the slurry tank.

9. The system of claim 8, wherein the second dust trap comprises a water spray nozzle, wherein the water spray nozzle is configured to spray water on captured hydrated lime dust, and wherein the second dust trap is configured to recirculate the sprayed water and captured dust to the slurry tank.

10. The system of claim 9, wherein a slurry concentration control system is configured to offset an amount of water sprayed by the water spray nozzle from the water added directly to the slurry tank to generate the hydrated lime slurry at a desired concentration.

11. The system of claim 1, further comprising a density meter configured to monitor a density of the hydrated lime slurry output from the slurry tank.

12. The system of claim 1, further comprising:

a control system configured to monitor an amount of water supplied to the hydrator by the water spray nozzles.

13. The system of claim 1, wherein the slurry tank further comprises a dust and vapor canister configured to capture, filter, and spray water on hydrated lime dust from the slurry tank, wherein the dust and vapor canister is configured to exhaust filtered air to the atmosphere and send the sprayed hydrated lime dust back to the slurry tank for processing.

14. The system of claim 1, wherein the distribution system is a direct slurry dosing line configured to inject the hydrated lime slurry directly into the separate process through a positive displacement pump.

15. The system of claim 1, wherein the water in the hydrator does not derive from the hydrated lime slurry generated in the slurry tank.

16. An integrated system for producing hydrated lime slurry from calcium oxide using dry hydrated lime as an intermediary, comprising:

a hydrator configured to receive calcium oxide and to mix the received calcium oxide with water to produce dry hydrated lime;

a dry hydrated lime transportation mechanism configured to transport the dry hydrated lime from the hydrator on a continuous basis over a period of time;

a storage silo configured to receive the dry hydrated lime from the transportation mechanism;

a dispensing system configured to dispense the dry hydrated lime from the storage silo;

a slurry tank configured to receive the dispensed dry hydrated lime and combine the dry hydrated lime with water to generate hydrated lime slurry; and a distribution system configured to transport the hydrated lime slurry from the slurry tank to a separate process that consumes hydrated lime slurry, wherein the slurry tank is configured to receive the entire output of dry hydrated lime from the storage silo via the dispensing system;

wherein the storage silo comprises two or more discharge cones configured to supply the dry hydrated lime to the slurry tank in two or more locations.

* * * * *